United States Patent [19]

Nakajima et al.

[11] Patent Number: 4,856,480

[45] Date of Patent: Aug. 15, 1989

[54] APPARATUS FOR CONTROLLING IGNITION TIMING IN INTERNAL COMBUSTION

[75] Inventors: Toyohei Nakajima; Toshiyuki Mieno; Akira Tanaka; Akira Nagao; Yukihiko Suzaki, all of Wako, Japan

[73] Assignee: Honda Giken Kogyo Kabushiki Kaisha, Tokyo, Japan

[21] Appl. No.: 262,049

[22] Filed: Oct. 24, 1988

Related U.S. Application Data

[63] Continuation of Ser. No. 67,076, Jun. 29, 1987, abandoned.

[30] Foreign Application Priority Data

Jul. 1, 1986 [JP] Japan .................................. 61-155696
Jul. 22, 1986 [JP] Japan .................................. 61-170931
Jul. 22, 1986 [JP] Japan .................................. 61-170936

[51] Int. Cl.$^4$ ............................................. F02P 5/14
[52] U.S. Cl. ..................................... 123/425; 123/416
[58] Field of Search ............... 123/425, 416, 417, 413, 123/414

[56] References Cited

U.S. PATENT DOCUMENTS

| | | | |
|---|---|---|---|
| 4,561,389 | 12/1985 | Matsumoto | 123/425 |
| 4,586,475 | 5/1986 | Takahashi et al. | 123/425 |
| 4,594,982 | 6/1986 | Takahashi et al. | 123/425 |
| 4,594,983 | 6/1986 | Takahashi et al. | 123/425 |
| 4,612,902 | 9/1986 | Abe et al. | 123/425 |
| 4,617,895 | 10/1986 | Sakakiba et al. | 123/425 |
| 4,630,583 | 12/1986 | Suzuki et al. | 123/425 |
| 4,660,535 | 4/1987 | Asano | 123/425 |
| 4,676,212 | 6/1987 | Kashimura et al. | 123/425 |

FOREIGN PATENT DOCUMENTS

| | | | |
|---|---|---|---|
| 55-91765 | 7/1980 | Japan | 123/425 |
| 56-20765 | 2/1981 | Japan | 123/425 |
| 58-82074 | 5/1983 | Japan | 123/425 |

Primary Examiner—Raymond A. Nelli
Attorney, Agent, or Firm—Armstrong, Nikaido, Marmelstein, Kubovcik & Murray

[57] ABSTRACT

An apparatus for controlling ignition timing in an internal combustion engine determines the amount of adjustment of ignition timing for preventing knocking with reference to the engine operating state. The amount of adjustment of the ignition timing carried out upon the detection of knocking is varied depending on the engine speed. Specifically, it is made large in the low speed region where the interval between successive firings is relatively long, thus increasing the speed with which knocking can be prevented and enhancing the protection of the engine from damage in this operating region. Also, rapid acceleration and other transient engine operating states are detected and a transient state adjustment is calculated separately of the adjustment amount for knocking prevention. The transient state adjustment is added to the knocking prevention adjustment and the result is used for retarding the ignition timing, whereby knocking can be effectively prevented during rapid acceleration. Further, after knocking has been prevented, the ignition timing is advanced with consideration given to reference knocking occurrence frequencies set independently for different engine operating conditions. Thus, the knocking occurrence frequency can be maintained at a fixed level irrespective of the engine operating condition, whereby the engine output can be optimized.

8 Claims, 8 Drawing Sheets

| Engine speed | Control region | Ref. no. of knockings Ikr(in no. of firings) | Judgment period In (in no. of firings) | Wait period Iw(in no. of firings) |
|---|---|---|---|---|
| 5000 ≤ Ne < 6500 | Z1 | 1 | 150 | 167 |
| 3000 ≤ Ne < 5000 | Z2 | 3 | 133 | 111 |
| 1000 ≤ Ne < 3000 | Z3 | 2 | 67 | 56 |
| 600 ≤ Ne < 1000 | Z4 | 2 | 67 | 33 |

FIG. 13

APPARATUS FOR CONTROLLING IGNITION TIMING IN INTERNAL COMBUSTION

This application is a continuation of application Ser. No. 067,076 filed June 29, 1987 now abandoned.

BACKGROUND OF THE INVENTION

1. Field of the Invention

This invention relates to an apparatus for controlling ignition timing in an internal combustion engine, more specifically to an apparatus for controlling ignition timing in an internal combustion during the occurrence of knocking.

2. Description of the Prior Art

In an apparatus for controlling ignition timing in an internal combustion engine it is important to cope with knocking. When knocking occurs, it is essential to eliminate it immediately so as to protect the engine from damage. It is also necessary to ensure that knocking prevention will be effectively carried out during all operating conditions of the engine including the times when the engine is in a transient state of operation. Further, after knocking has been prevented, it is necessary to promptly restore the ignition timing to its initial value so as not to cause a reduction in engine output, but this must be done while continuing to prevent recurrence of knocking. As shown for example in Laid-open Japanese Patent Application No. 58(1983)-82074, it is well known in the prior art to eliminate knocking by retarding the ignition timing when knocking begins. In the prior art, however, the retardation of the ignition timing upon the occurrence of knocking has been carried out in increments of one degree so that the target ignition timing can be reached only over a considerable number of firings. This is particularly troublesome in the low engine speed operating region since the time interval between firings is relatively long in this region and it therefore takes a long time to eliminate knocking once it starts. As a result, the drivability of the vehicle powered by the internal combustion engine is impaired and the danger of the engine being damaged is increased.

The prior art has also entailed drawbacks as regards the control of ignition timing during transient states of engine operation, e.g. during rapid acceleration. This is true, for example, when the shape etc. of the combustion chamber is designed so as to enable the ignition to be timed near the knocking limit during normal engine operation in order to enhance engine operating efficiency. In such cases, the conventional ignition timing apparatus such as that disclosed in Laid-open Japanese Patent Application 56(1981)-20765 are incapable of completely eliminating knocking during rapid acceleration, and this is true even of those that employ knocking feedback in their ignition control systems. Typically, the conventional apparatuses will either retard the timing too little to prevent the knocking or will retard it excessively and thus reduce the engine operating efficiency to an unnecessary degree.

There have also been problems regarding the advancing of the ignition timing to restore it to near its initial value after knocking has been prevented. While as disclosed in Laid-open Japanese Patent Application No. 55(1980)-91765, it has been proposed to vary the length of an ignition advance wait period (the number of firings allowed to pass before starting to advance the timing to restore it to its initial value) with reference to the knocking occurrence frequency, the prior art apparatus merely varies the wait period depending on whether or not there were one or more occurrences of knocking within the past 32 or 128 firings and does not determine the advance of ignition angle with reference to any other engine operating conditions such as by determining it with reference to the results of a detection carried out to determine whether the engine has changed from a normal operating state to a transient operating state. As a result it is impossible to ensure optimum engine performance at all times. While during operation of the engine in the low speed region it is preferable from the point of obtaining optimum output to time the ignition at or near the point where trace knocking occurs, during high speed operation it is necessary to use a more retarded ignition timing so as to prevent the occurrence of frequent knocking from damaging the engine and shortening its service life. On the other hand, when the engine is in a transient state, particularly during rapid acceleration, while it is impossible to avoid some increase in the knocking occurrence frequency, it is still necessary to hold this frequency within certain bounds in order to protect the engine. Therefore, in order to optimize engine output and vehicle drivability, in determining the restoration (advancing) of the timing after knocking has prevented it is necessary not only to vary the reference knocking occurrence frequency in consideration of the engine operating condition but also to discriminate whether the engine is in normal operating state or in a transient operating state and on the basis of this discrimination to change the reference knocking occurrence frequency so as to hold the knocking occurrence frequency to a constant value irrespective of changes in the operating condition of the engine. The prior art techniques leave much to be desired in the respect.

SUMMARY OF THE INVENTION

In consideration of the aforesaid shortcomings of the prior art, it is an object of the invention to provide an apparatus for controlling the ignition timing in an internal combustion engine wherein the ignition timing at the time of knocking is determined with reference to the engine operating condition.

Another object of the invention is to provide an apparatus for controlling the ignition timing in an internal combustion engine wherein the amount of ignition timing adjustment at the time of knocking is determined with reference to the engine operating condition such that knocking can be promptly prevented and damage to the engine can be prevented during all engine operating conditions, particularly during low speed operating condition, and that the drivability of the vehicle powered by the engine is enhanced.

Still another object of the invention is to provide an apparatus for controlling the ignition timing in an internal combustion engine wherein knocking is reliably prevented in the transient operating state and the amount of retarding adjustment of the ignition timing is appropriately determined to prevent unnecessary reduction of the engine output.

Still another object of the invention is to provide an apparatus for controlling the ignition timing in an internal combustion engine wherein the ignition timing is determined with reference to the engine operating condition and the frequency of knocking occurrence even at the time the ignition timing is being advanced to restore it to the initial value following the elimination of knocking, whereby recurrence of knocking is prevented as the engine operation is being optimized, and the drivability of the vehicle powered by the engine is enhanced.

For realizing these objects, the present invention provides an apparatus for controlling the ignition timing in an internal combustion engine, comprising a device for detecting the angular position of an engine crankshaft disposed in the vicinity of a rotating member of the engine. A device for detecting the state of engine load disposed at an appropriate part of the engine, a device for detecting the state of combustion of an air/fuel mixture disposed in the vicinity of a combustion chamber, a device for detecting knocking on the basis of the output of the combustion state detection device are also provided. A device for determining a basic ignition timing on the basis of the outputs of the crankshaft angle detection device and the engine load state detection device and for adjusting the basic ignition timing by a predetermined amount on the basis of the output of the knocking detection device is provided. An ignition device ignites an air/fuel mixture in the combustion chamber upon receiving the output of the ignition timing determining device. In the apparatus, the amount of adjustment of the basic ignition timing is determined with reference to the engine operating condition.

The above and other features of the present invention will become apparent from the following description made with reference to the drawings.

DESCRIPTION OF THE PREFERRED EMBODIMENTS

Figure 1:
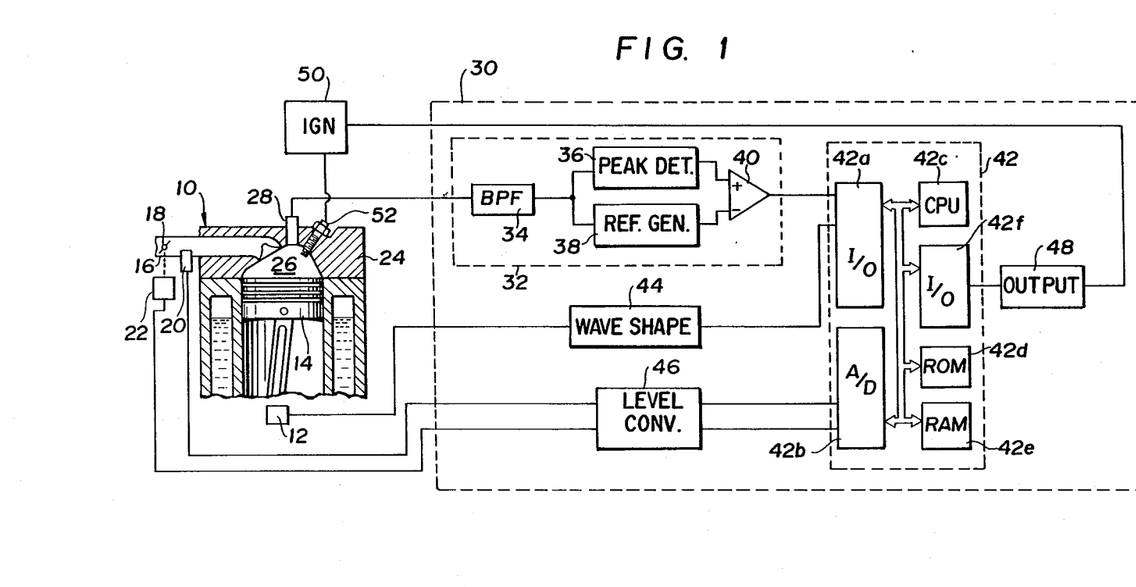
FIG. 1 is a block diagram showing the overall structure of an apparatus for controlling ignition timing in an internal combustion engine according to the invention.

FIG. 1 is a block diagram showing the overall arrangement of the control apparatus according to the invention. As shown in the figure, a crankshaft angle sensor 12, which may be constituted using an electromagnetic pickup or the like, is disposed in the vicinity of a rotating member of a four-cylinder internal combustion engine 10 for detecting changes in the crankshaft angle of the internal combustion engine 10 caused by reciprocating movement of pistons 14 (only one shown). A throttle valve 18 provided in an air intake passage 16 is linked with an accelerator pedal (not shown) so as to open and close when the operator of the vehicle powered by the engine depresses and releases an accelerator pedal. A pressure sensor 20 is provided downstream of the throttle valve 18 for detecting the absolute pressure of the air flowing at this point. The detected pressure of the intake air is used for determining the engine load condition. A throttle sensor 22 constituted as a potentiometer or the like is provided in the vicinity of the throttle valve 18 for detecting the degree of opening thereof.

The internal combustion engine 10 is further provided at an appropriate part of a cylinder head 24 with a knocking sensor 28 for sensing the state of combustion of an air/fuel mixture in a combustion chamber 26. The output of the knocking sensor 28 is sent to a control unit 30 where it is input to a knocking detection circuit 32. In the knocking detection circuit 32, the signal from the knocking sensor 28 is initially input to a band pass filter 34 for extraction of only the knocking frequency component. The output of the band pass filter 34 is, on the one hand, sent to a peak detection circuit 36 where the peak value of the knocking signal is detected. It is also forwarded to a comparison reference value generator 38 where the mean value of the signal from the knocking sensor 26 during non-knocking operation is determined. The outputs of the peak detection circuit 36 and the comparison reference value generator 38 are sent to a comparator 40 where the two outputs are compared and when the peak value exceeds the mean value, it is determined that knocking has occurred. The stage following the knocking detection circuit 32 is a microcomputer 42. The main components of the microcomputer 42 are an input panel 42a, an A/D (analog/digital) converter 42b, a CPU (central processing unit) 42c, a ROM (read-only memory) 42d, a RAM (random access memory) 42e and an output panel 42f. The output of the knocking detection circuit 32 is input to the microcomputer 42 and stored in the RAM 42e.

The output of the crankshaft angle sensor 12 is also input to the control unit 30, wherein it is first shaped by a wave-shaping circuit 44 and then input to the microcomputer 42 via the input panel 42a for storage in the RAM 42e. The outputs from the pressure sensor 20 and the throttle sensor 22 are level-converted in a level converter 46 and then sent to the microcomputer 42, where they are first converted to digital form by the A/D converter 42b and then stored in the RAM 42e. The CPU 42c determines the ignition timing by using the outputs of the crankshaft angle sensor 12 and the pressure sensor 22 to retrieve mapped values stored in the ROM 42d. It also discriminates from the output of the knocking detection circuit 32 whether or not knocking has occurred and when knocking has occurred, it first adjusts (retards) the ignition timing by a predetermined amount and then after knocking has been prevented, further adjusts the ignition timing by a predetermined amount in the direction of ignition advance. The CPU 42c also calculates from the output of the throttle sensor 22 the rate of change in the opening of the throttle valve 18 per unit time and from the result calculates the rate of opening of the throttle valve 18, in this way detecting whether or not the engine is in a transient operating state, particularly whether it is in a rapidly accelerating state, and if it is, adjusts the ignition timing by a predetermined amount in a manner to be explained later. Alternatively, the throttle sensor 22 may be omitted and the detection of transient operating state can be detected from the rate of change per unit time in the outputs of the crankshaft angle sensor 12 and/or the pressure sensor 20. The determined ignition timing is sent to an output circuit 48 constituting the next stage following the microcomputer 42, and from the output circuit 48 is sent to an ignition device 50 constituted of an igniter, distributor and the like (not shown). The ignition device 50 actuates an ignition plug 52 so as to ignite the air/fuel mixture in the combustion chamber 26.

Figure 2:
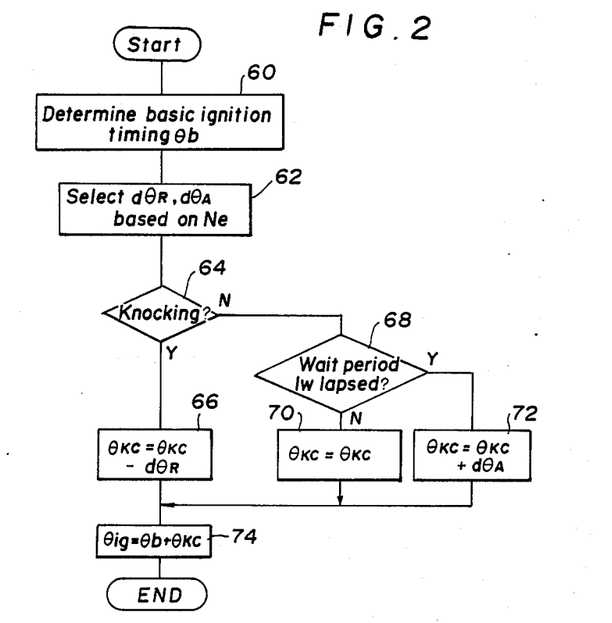
FIG. 2 is a flowchart showing the operation of the apparatus of FIG. 1.

The operation of the control apparatus according to the invention will now be explained with reference to the flowchart of FIG. 2. The program is started once per predetermined crankshaft angle.

First, in step 60, the basic ignition timing $\theta b$ is determined. Namely, the microcomputer 42 retrieves the ignition timing from mapped values stored in the ROM 42d using the outputs from the crankshaft angle sensor 12 and the pressure sensor 20 as address data. Moreover, while not shown, it is also possible to provide the engine with a coolant temperature sensor or the like and use the output thereof for appropriately compensating the retrieved basic ignition timing.

Figure 3:
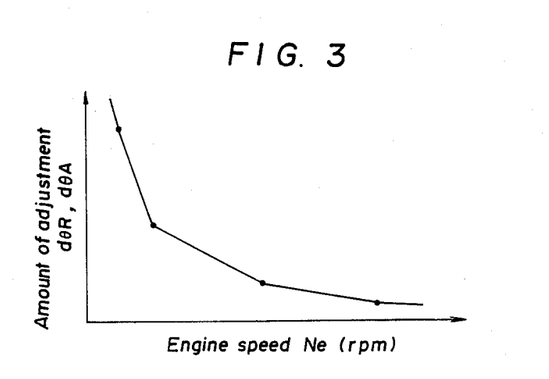
FIG. 3 is a graph for explaining adjustment amounts $d\theta R$ and $d\theta A$ used in a calculation carried out in the flowchart of FIG. 2.

In the succeeding step 62, the engine speed Ne calculated from the value detected by the crankshaft angle sensor 12 is used to determine in advance a retardation amount $d\theta R$ and an advancement amount $d\theta A$ for use at the time of knocking. The characteristics of these adjustments $d\theta R$ and $d\theta A$ are shown in the graph of FIG. 3. One characterizing feature of this invention is that the amount of these adjustments is varied depending on the engine speed. More specifically, as shown in the figure, the adjustments are set to be relatively large in the low speed operating region and to grow smaller in proportion as the engine speed increases. (While in this embodiment the advancement amount $d\theta A$ is dependent on the engine speed as well as the retardation amount $d\theta R$, it can alternatively be set at a fixed value.) The characteristics of the adjustment amounts shown in FIG. 3 are stored in the ROM 42d of the microcomputer 42, and the required values are retrieved using the engine speed calculated by the microcomputer 42 as address data.

The procedure then moves to step 64 where it is determined from the output of the knocking detection circuit 32 whether or not knocking has occurred and when it has, the procedure goes to step 66 where a knocking adjustment amount $\theta kc$ is retarded by the retardation amount $d\theta R$ selected in the step 62. It should be noted in the flowchart, retardation of the ignition angle is shown as subtraction while advancement thereof is shown as addition. The initial value of the knocking adjustment amount $\theta kc$ is zero.

When it is found in the step 64 that knocking has not occurred, the procedure moves to step 68 where it is determined whether an ignition advance wait period Iw (defined in terms of a prescribed number of firings) has passed, and if it has not, the procedure moves to step 70 where the knocking adjustment amount $\theta kc$ used in the preceding cycle is left unchanged. When it is found in the step 68 that the ignition advance wait period Iw has lapsed, the procedure goes to step 72 where the knocking adjustment amount $\theta kc$ is returned in the direction of advance by amount $d\theta A$. The ignition advance wait period Iw can be of fixed length or can be varied depending on the engine operating condition. In the final step 74, the knocking adjustment amount $\theta kc$ is added to the basic ignition timing $\theta b$ to obtain the final ignition timing $\theta ig$, which is then sent to the ignition device 50 via the output circuit 48.

Figure 4:
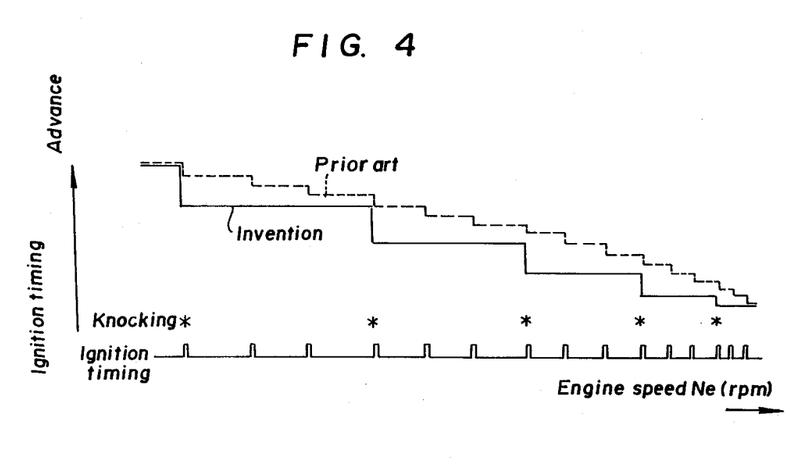
FIG. 4 is a graph for explaining the ignition timing control according to the flowchart of FIG. 2, in comparison with the prior art technique.

FIG. 4 shows a comparison of the results obtained with the embodiment described above and those obtained by the prior art apparatus. It will be noted that, particularly in the low speed operating region where the interval between firings is relatively long, the apparatus according to the present invention is capable of more rapidly adjusting the ignition timing to the value required for elimination of knocking. As a result, damage to the engine can be prevented and the drivability of the vehicle powered by the engine can be improved.

Figure 5:
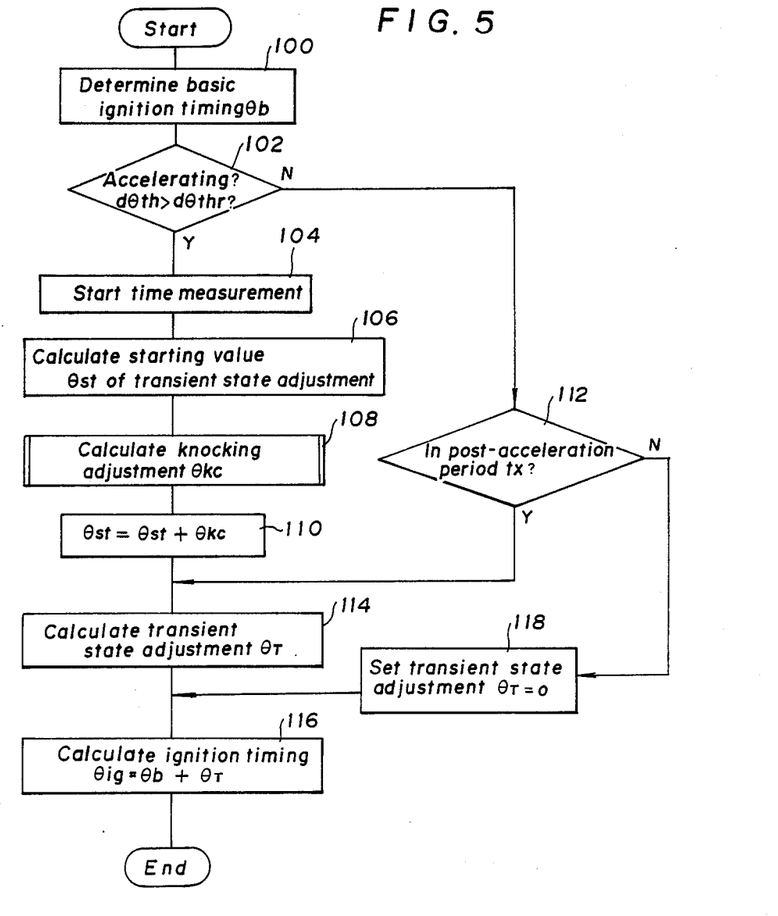
FIG. 5 is a flowchart showing a second embodiment of the invention.

FIG. 5 shows a second embodiment of the invention in which special attention is given to coping with knocking during acceleration. Also, the program is initiated at a predetermined crankshaft angle.

Referring to FIG. 5, a basic ignition timing $\theta b$ is determined in step 100 and the procedure then moves to step 102 where it is determined from the rate of change $d\theta th$ calculated from the output of the throttle sensor 22 whether the engine operating state is one of acceleration, more specifically whether the engine is accelerating at that instant. That is, the calculated value of $d\theta th$ is compared with an acceleration discrimination value $d\theta thr$ and it is determined that the engine is accelerating at that instant if the former value is larger than the latter. The expression "the engine is accelerating at that instant" used here means only a time when the rate of opening of the throttle valve 18 at the instant concerned exceeds the acceleration discrimination value, and does not include a period following thereof. Alternatively, the accelerating state may be determined from the rate of changes per unit time in the outputs of the crankshaft angle sensor 12 and the pressure sensor 20, as beforementioned. Moreover, the acceleration discrimination value may be so set as to enable the detection of the state of acceleration to be limited to the detection of rapid acceleration.

Figure 6:
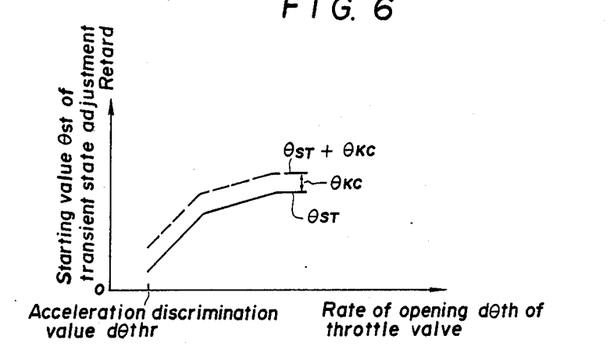
FIG. 6 is a graph for explaining a starting value $d\theta st$ of an adjustment amount during transient engine operation used in the flowchart of FIG. 5.
Figure 7:
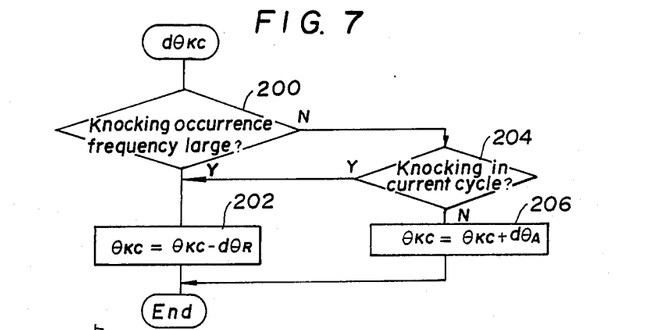
FIG. 7 is a flowchart showing a subroutine of the flowchart of FIG. 5.

When it is determined in step 102 that the engine is accelerating at that instant, the procedure moves to step 104 where a time counter (not shown) in the microcomputer 42 is started for beginning the measurement of lapsed time t from the exceeding point determined at step 102. Then in the succeeding step 106, a starting value $\theta st$ for the adjustment during transient state is calculated. The characteristic curve of the starting value $\theta st$ is shown in FIG. 6. When the rate of change $d\theta th$ calculated from the output of the throttle sensor 22 is greater than the acceleration discrimination value $d\theta thr$ and it is determined that the engine is accelerating at that instant, the starting value $\theta st$ for the adjustment during transient state is determined from the characteristic curve shown in FIG. 6 on the basis of rate of change $d\theta th$. The starting value $\theta st$ is inherently an angle of retardation. The characteristics represented by the curve in FIG. 6 are stored in tabular form in the ROM 42d and the starting values θst are retrieved using the amount of change dθth as address data. The procedure then moves to step 108 where the knocking adjustment amount θkc is calculated. This calculation is made in accordance with the subroutine shown by the flowchart shown in FIG. 7. In step 200, the knocking occurrence frequency is calculated and it is determined whether the calculated value exceeds a predetermined value. The knocking occurrence frequency is determined based on in how many of a prescribed number of earlier firings knocking occurred. (The calculation of the knocking occurrence frequency will be explained in detail in conjunction with the third embodiment of the invention.) When it is determined in the step 200 that the knocking occurrence frequency is equal to or greater than the predetermined value, since this means that knocking is likely to occur, the procedure moves to step 202 where the knocking adjustment amount θkc is retarded by amount dθR irrespective of whether or not knocking actually occurred during the current cycle. On the other hand, when it is determined in the step 200 that the knocking occurrence frequency is less than the predetermined value, the procedure moves to step 204 where it is determined whether or not knocking occurred during the current cycle and if it did, retarding adjustment is carried out, and if it did not, the ignition timing is advanced by the amount dθA (steps 204, 206). In the present embodiment, since the knocking adjustment amount is calculated only when it is determined that the engine is accelerating at that instant, there is no need for a step for determining whether or not an ignition advance wait period or the like has lapsed It should be noted that the retardation amount dθR and the advancement amount dθA can either be varied with reference to the engine operating condition as in the first embodiment or be set at fixed values. Even if they are set at fixed values, there is no danger of the problem mentioned in connection with the first embodiment arising since as will be explained below a retardation adjustment amount is calculated by adding a transient state adjustment amount to the knocking adjustment amount.

Figure 8:
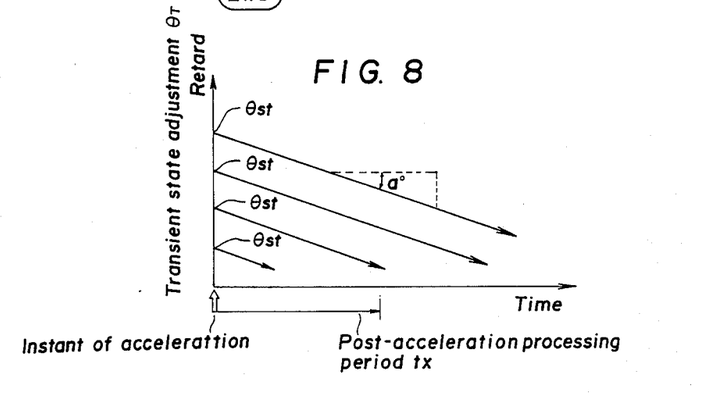
FIG. 8 is a graph for explaining a final value $d\theta T$ of the adjustment amount during transient engine operation used in the flowchart of FIG. 5.

Returning to the flowchart of FIG. 5, after the knocking adjustment amount θkc has been calculated, the procedure moves to step 110 where the knocking adjustment amount θkc is added to the starting value θst for the adjustment during transient state. More specifically, as shown in FIG. 6, the transient state adjustment starting value is superposed on the knocking adjustment amount. When it is determined in the step 102 that the engine is not accelerating at that instant, the procedure moves to step 112 where it is determined whether, as shown in FIG. 8, the state of operation is now in a post-acceleration processing period tx following the instant of acceleration. This determination is made based on the count value t of the aforesaid time counter. In the succeeding step 114, final value θT of the transient state adjustment is calculated. The characteristics of this final value θT are shown in FIG. 8. These characteristics are stored in the ROM 42d in tabular form. As shown in the figure, the final value θT is set to start from the starting value θst and decrease with the passage of time during the post-acceleration processing period tx. Therefore, when it is determined in the step 102 that the engine is accelerating at that instant, the starting value θst (more precisely, the sum of this value and the knocking adjustment amount θkc) is used as the final transient state adjustment amount θT. On the other hand, when it is determined that the operating state is in the post-acceleration processing period tx, the final value θT is calculated by multiplying the starting value θst calculated in the step 110 by a predetermined attenuation rate a per unit time and then multiplying this product by the lapsed time t. FIG. 8 shows several values of θst so that one value must be selected therefrom. In the succeeding step 116, the final value θT is added to basic ignition timing θb to obtain the final ignition timing θig, which is issued as the ignition command. In the step 112, when it is determined that the state of operation is not in the post-acceleration processing period tx, the final transient state adjustment θT is set at zero (step 118).

In the present embodiment, at the instant of acceleration and in the predetermined processing period following this instant, the ignition timing is adjusted in the direction of retardation by the amount of the final transient state adjustment value θT and, when the engine is accelerating at the instant concerned, this value θT further has the knocking adjustment amount θkc added thereto. Therefore, the knocking which is likely to occur during acceleration can be effectively prevented. Further, since the starting value θst for the adjustment during transient state and the final value θT are stored in the ROM 42d of the microcomputer 42, the amount of adjustment during transient state can be easily determined, making it possible to reliably prevent knocking to realize precise control of the ignition timing.

Figure 9:
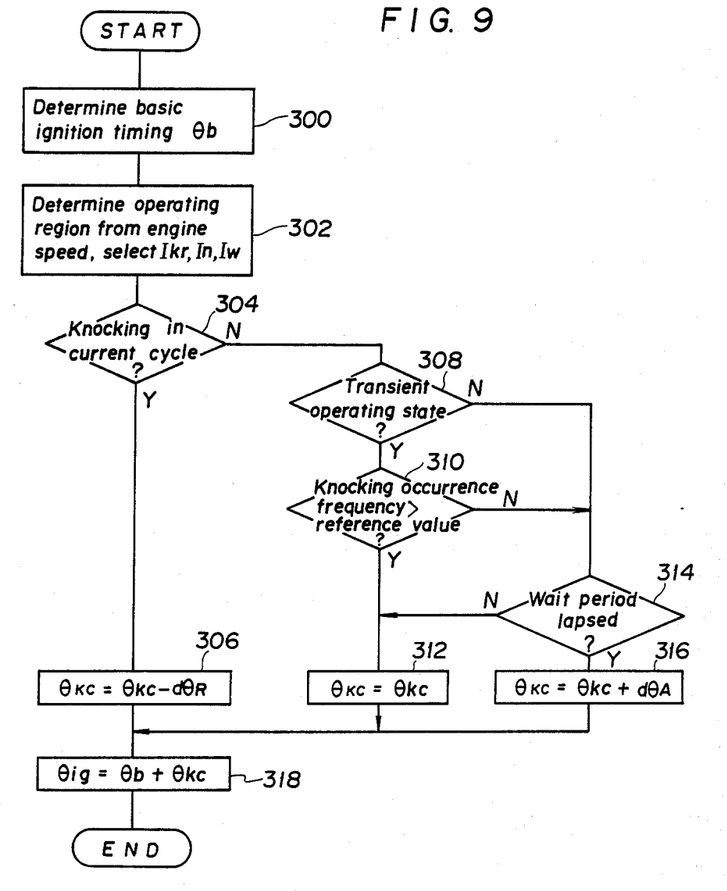
FIG. 9 is a flowchart showing a third embodiment of the invention.
Figure 10:
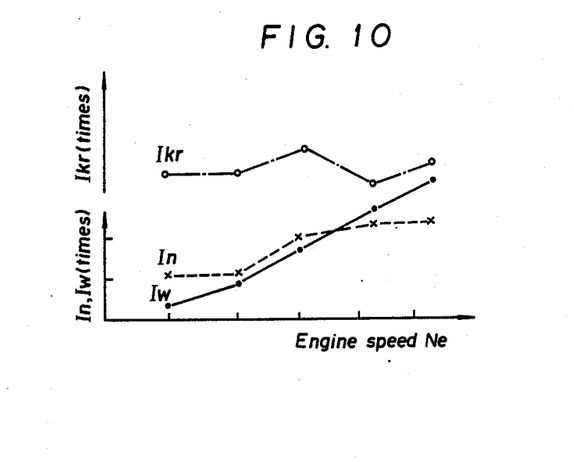
FIG. 10 is a graph for explaining calculation coefficients used in the flowchart of FIG. 9.
Figure 11:
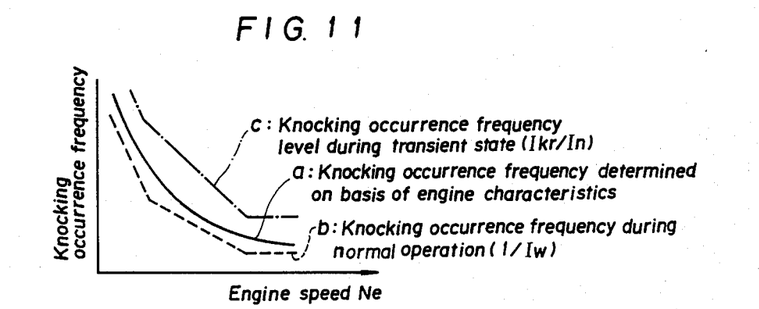
FIG. 11 is a graph showing the relationship between the calculation coefficients of FIG. 10 and the knocking occurrence frequency.
Figure 12:
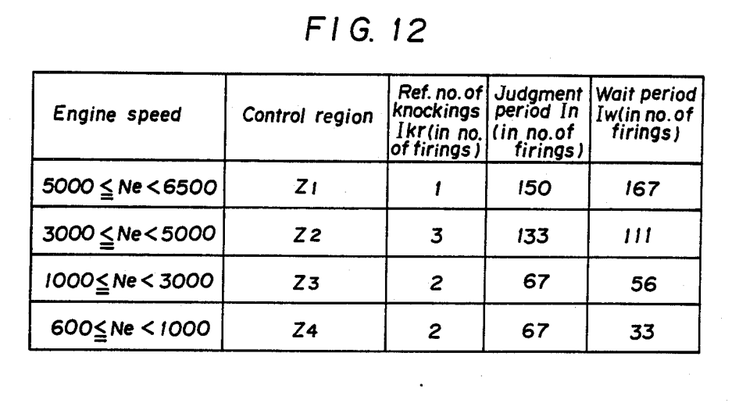
FIG. 12 is a table of specific values of the calculation coefficients of FIG. 10 which is stored in a ROM of a microcomputer.

FIG. 9 shows a flowchart in accordance with a third embodiment of the present invention. Referring to this flowchart, a basic ignition timing θb is determined in the first step 300 and the procedure then moves to step 302 where calculation coefficients such as a reference number of knockings in number of firings Ikr, a number of firings for determining ignition advance In and an ignition advance wait period Iw are selected. These selections are made for use in calculating the knocking occurrence frequency in a manner to be explained below. FIG. 10 is a graph showing the characteristics of these values. As was mentioned earlier, when the engine is operating at low speed it is preferable to time the ignition to occur in the vicinity of the point at which trace knocking occurs so as to obtain optimum output from the engine. However, since in high speed operation knocking is apt to cause damage to the engine, it is necessary to keep the ignition timing at a more retarded position. Thus, as shown in FIG. 11, during normal engine operation, it is desirable that the ignition timing of the engine be controlled such that the knocking occurrence frequency (Curve b) is lower than the aforesaid trace knocking level indicated by the Curve a, this trace knocking level being determined from the intrinsic characteristics of the engine as a knocking occurrence frequency that is inversely proportional to the engine speed. On the other hand, during rapid acceleration and other transient states of engine operation, it becomes impossible to obtain the required increase in engine output without increasing the frequency of knocking. But even in this case, for protecting the engine it is necessary to keep the frequency of knocking below a prescribed limit value (Curve c). Therefore, at the time of determining the advancing adjustment of the ignition timing following prevention of knocking, a plurality of reference knocking occurrence frequencies are set and the ignition timing is controlled after discriminating whether the engine is in a normal or a transient state of operation, whereby it becomes possible to obtain a uniform knocking occurrence frequency irrespective of changes in the engine operating condition as well as to operate the engine at optimum output. The values shown for the reference number of firings with knocking Ikr etc. in FIG. 10 are set on the basis of the knocking occurrence frequency of FIG. 11, and Ikr/In is set to correspond to the knocking occurrence frequency during knocking (Curve c of FIG. 11) and 1/Iw is set to correspond to the knocking occurrence frequency during normal operation (Curve b in FIG. 11). More specifically, the ignition advance wait period Iw can, in the sense that a single occurrence of knocking is permissible within this period, be thought of as the reciprocal of the knocking occurrence frequency. FIG. 12 shows actual examples of these values which are stored in the form of a data table in the ROM 42$d$ of the microcomputer 42. In the table, the range of engine speeds between 600 and 6,500 rpm is divided into four control regions Z, and the same values are used for all engine speeds within each control region.

Returning to FIG. 9, in the succeeding step 304 it is determined whether or not knocking occurred during the current cycle and if it did, the operation moves to step 306 where the knocking adjustment amount $\theta$kc is retarded by amount $d\theta$R. The retardation amount $d\theta$R can either be varied with reference to the engine operating condition as in the first embodiment or be set at a fixed value. Even if it is set at fixed value, there is no danger of the problem mentioned in connection with the first embodiment arising since, as will be explained below, the ignition timing is determined with reference to the knocking occurrence frequency. When it is determined that knocking did not occur in the current cycle, the procedure moves to step 308 where it is determined whether or not the engine is in a transient operating state and if it is, the procedure moves to step 310 where the knocking occurrence frequency is calculated. Specifically it is determined whether $$Ikra/In > Ikr/In$$

The values of Idr and In are those selected in the step 302 and the value used for Ikra is calculated by counting the actual number of occurrences of knocking within the determined interval concerned. When it is found that Ikra/In is greater than Ikr/In, this means the transient state knocking occurrence frequency (Curve c in FIG. 11) has been exceeded. Therefore, in order to protect the engine, advancing of the ignition timing is stopped (step 312).

When it is found in step 310 that Ikra/In is not greater than Ikr/In or when it is found in the preceding step 308 that the engine is not in a transient operating state, the operation moves to step 314 where it is determined whether or not the ignition advance wait period Iw, which is the reciprocal of the knocking occurrence frequency during normal operating state, has passed. If it has not, adjustment of the ignition timing in the advance direction is prohibited (step 312), and if it has, the ignition timing is advanced by the amount $d\theta$A (step 316). Then the final ignition timing $\theta$ig is determined in the last step 318. Similarly to what was said about the retardation amount $d\theta$R, the advancement amount $d\theta$A may also either be varied depending on the engine operating condition or be set as a fixed value. Also, while not shown in the figures, ignition is carried out at respective appropriately determined fixed angles when the engine speed is less than 600 rpm or greater than 6,500 rpm.

Figure 13:
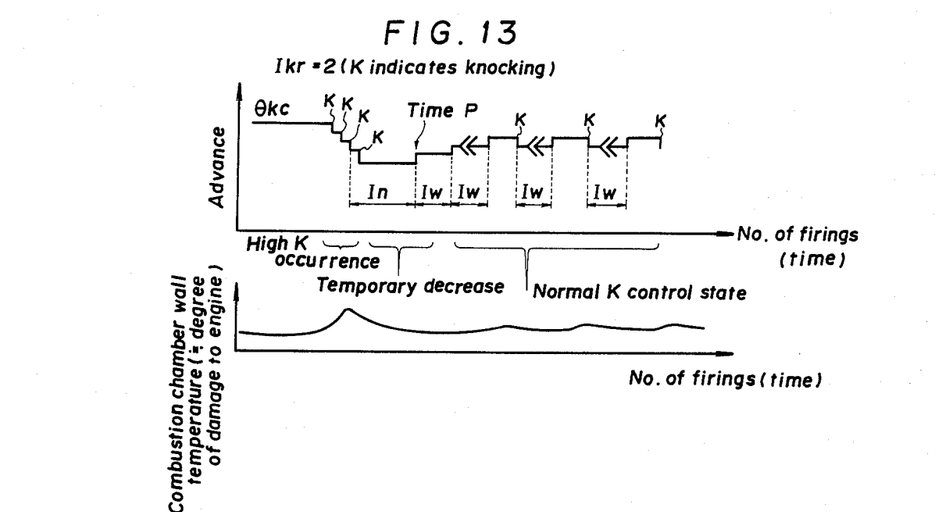
FIG. 13 is a graph concretely representing the ignition timing control method according to the third embodiment of the invention.

FIG. 13 shows an example for the case where ignition timing control is carried out in accordance with the aforesaid third embodiment of the invention. The current time is indicated by the point "p". Using the value of 2 from FIG. 12 for the reference number of firings with knocking Ikr, then since the actual number of firings with knocking during the determination period In (a period extending up to time p from a predetermined number of firings earlier) is 1, the result of the frequency calculation in step 310 will be that 1/In is smaller than the predetermined value 2/In so that, if it is determined in step 314 that the wait period Iw has lapsed, the ignition timing will be advanced by amount $d\theta$A. More specifically, while in the figure it an be presumed that the engine was in a transient state of operation with frequent knocking prior to the period In, thanks to the inclusion of the step 310 in which the transient state knocking occurrence frequency was determined, it was possible to temporarily reduce the knocking occurrence frequency and thus protect the engine from damage. In prior art techniques, no such determination is made. Thus, since the wait period time is short during high speed operation, the conventional apparatuses almost immediately advance the ignition timing thus causing knocking to recur. As a result, a cycle consisting of knocking, ignition retardation and ignition advancement is repeated again and again, which adversely affects the engine. Being arranged as described in the foregoing, the present embodiment of the invention is able to maintain the knocking occurrence frequency at a constant level irrespective of whether the engine is operating in a low speed region or a high speed region. As a result, optimum engine performance can be obtained under all operating conditions.

The present invention has thus been shown and described with reference to specific embodiments. However, it should be noted that the present invention is in no way limited to the details of the described arrangements but changes and modifications may be made without departing from the scope of the appended claims.

What is claimed is:

1. An apparatus for controlling ignition timing in an internal combustion engine, comprising:
   first means for detecting an angular position of an engine crankshaft to generate an output signal indicative of engine speed;
   second means for detecting a state of engine load through an intake air drawn into the engine to generate an output signal in response thereto;
   third means for detecting a knock condition of the engine to generate an output signal in response thereto;
   control means for receiving the output signals of the first, second and third means, for determining a basic ignition timing of the engine based upon the detected engine speed and engine load, and when the knock condition is detected by said third means, said control means retarding the basic ignition timing by an amount which is inversely proportional to the engine speed, said amount being larger at a low engine speed than at a high engine speed such that retardation of the basic ignition timing is quicker at low engine speed, said control means generating an output signal based upon the determined ignition timing; and ignition means for receiving the output signal of the control means to ignite an air/fuel mixture in a combustion chamber of the engine.

2. An apparatus according to claim 1, wherein said control means advances the retarded ignition timing after the knock condition has been prevented by an amount which is inversely proportional to the engine speed.

3. An apparatus for controlling ignition timing is an internal combustion engine, comprising:
   first means for detecting an angular position of an engine crankshaft to generate an output signal indicative of engine speed;
   second means for detecting a state of engine load through an intake air drawn into the engine to generate an output signal in response thereto;
   third means for detecting a knock condition of the engine to generate an output signal in response thereto;
   fourth means for detecting a state of acceleration of the engine to generate an output signal in response thereto;
   control means for receiving the output signals of the first, second, third and fourth means, for determining a basic ignition timing of the engine based upon the detected engine speed and engine load, when the knock condition is detected, said control means adjusting the basic ignition timing, and when an acceleration state is detected, said control means further adjusting the basic ignition timing in a retard direction by an amount depending upon the degree of acceleration, said control means generating a signal based upon the determined ignition timing; and
   ignition means for receiving the signal of the control means to ignite an air/fuel mixture in a combustion chamber of the engine.

4. An apparatus according to claim 3, wherein said control means continues to adjust the ignition timing in the retard direction for a predetermined period when the acceleration state is detected.

5. An apparatus according to claim 4, wherein said adjusting amount for the acceleration is attenuated for a predetermined period over time.

6. An apparatus according to claim 4, wherein said adjusting amount for the acceleration state is attenuated at the same rate irrespective of the acceleration degree.

7. An apparatus according to claim 6, wherein said acceleration state and acceleration degree are detected from a change rate of an opening degree of a throttle valve.

8. An apparatus according to claim 7, wherein said acceleration state is a rapid acceleration state.

* * * * *